US009594888B1

United States Patent
Vipond

(10) Patent No.: US 9,594,888 B1
(45) Date of Patent: *Mar. 14, 2017

(54) USER AUTHENTICATION DEVICE

(71) Applicant: Edward W. Vipond, Gardner, MA (US)

(72) Inventor: Edward W. Vipond, Gardner, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/626,198

(22) Filed: Sep. 25, 2012

Related U.S. Application Data

(63) Continuation-in-part of application No. 13/532,309, filed on Jun. 25, 2012, now Pat. No. 8,752,148.

(51) Int. Cl.
*G06F 21/00* (2013.01)
*G06F 21/31* (2013.01)
*H04L 29/06* (2006.01)

(52) U.S. Cl.
CPC ......... *G06F 21/31* (2013.01); *H04L 63/0853* (2013.01)

(58) Field of Classification Search
CPC ....... G06F 21/34; G06F 21/31; G06Q 20/341; G07F 7/1008; G06K 19/07; G06K 19/0704; H04L 63/0853
USPC ............................................................ 726/9
See application file for complete search history.

(56) References Cited

U.S. PATENT DOCUMENTS

| | | | |
|---|---|---|---|
| 7,831,837 B1* | 11/2010 | Duane et al. | 713/185 |
| 2005/0239440 A1* | 10/2005 | Chen et al. | 455/411 |
| 2007/0253137 A1* | 11/2007 | Maloney | 361/160 |
| 2010/0088754 A1* | 4/2010 | Ghislanzoni | 726/9 |
| 2011/0066777 A1* | 3/2011 | Della Pia et al. | 710/106 |
| 2011/0113245 A1* | 5/2011 | Varadarajan | 713/168 |

\* cited by examiner

*Primary Examiner* — Yogesh Paliwal
(74) *Attorney, Agent, or Firm* — Krishnendu Gupta; Jason A. Reyes

(57) ABSTRACT

There is disclosed a user authentication device for issuing authentication information. The user authentication device comprising a photovoltaic panel configured such that the photovoltaic panel can assist in powering the device in response to the device being exposed to the light.

9 Claims, 4 Drawing Sheets

USER AUTHENTICATION DEVICE

RELATED APPLICATION

This application is a continuation-in-part application claiming priority to co-pending U.S. patent application Ser. No. 13/532,309, filed Jun. 25, 2012, reference no. EMC-12-145, entitled "PROCESSORLESS TOKEN FOR PRODUCING A ONE-TIME PASSWORD", the entirety of which patent application is hereby incorporated by reference herein.

FIELD OF THE INVENTION

The present invention relates generally to the field of secure authentication, and more particularly to authentication devices that issue authentication information for facilitating access to an access-controlled resource.

BACKGROUND OF THE INVENTION

User authentication devices such as authentication tokens are typically implemented as small, hand-held devices that display a series of passwords over time. These passwords, which may be one-time passwords, are more generally referred to as tokencodes. A user equipped with such an authentication token reads the currently displayed password and enters it into a computer or other element of an authentication system as part of an authentication operation. This type of dynamic password arrangement offers a significant security improvement over authentication based on a static password.

Conventional authentication tokens include both time-based tokens and event-based tokens. The latter are also referred to herein as event-triggered tokens. In a typical time-based token, the displayed passwords are based on a secret value and the time of day. A verifier with access to the secret value and a time of day clock can verify that a given presented password is valid. Event-based tokens generate passwords in response to a designated event, such as a user pressing a button on the token. Each time the button is pressed, a new password is generated based on a secret value and an event counter. A verifier with access to the secret value and the current event count can verify that a given presented password is valid.

Passwords can be communicated directly from the authentication token to a computer or other element of an authentication system, instead of being displayed to the user. For example, a wired connection such as a universal serial bus (USB) interface may be used for this purpose. Wireless authentication tokens are also known in such tokens, the passwords are wirelessly communicated to a computer or other element of an authentication system. These wired or wireless arrangements save the user the trouble of reading the password from the display and manually entering it into the computer.

Additional details of exemplary conventional authentication tokens can be found in, for example, U.S. Pat. No. 4,720,860, entitled "Method and Apparatus for Positively Identifying an Individual," U.S. Pat. No. 5,168,520, entitled "Method and Apparatus for Personal Identification," and U.S. Pat. No. 5,361,062, entitled "Personal Security System," all of which are incorporated by reference herein.

It is generally desirable in authentication tokens and other hand-held devices to minimize power consumption. This is especially the case with respect to authentication tokens as the battery cannot be replaced. In such tokens, the battery is stored in a sealed secured environment. Because of security issues surrounding the tokens, it is not possible to replace the battery without rendering the device ineffective. Consequently, the authentication tokens have a finite life.

SUMMARY OF THE INVENTION

There is disclosed a user authentication device for issuing authentication information. The user authentication device comprising a photovoltaic panel configured such that the photovoltaic panel can assist in powering the device in response to the device being exposed to the light.

Additionally, there is disclosed an authentication system comprising a user authentication device for issuing authentication information. The user authentication device comprising a photovoltaic panel configured such that the photovoltaic panel can assist in powering the device in response to the device being exposed to the light. The authentication system also comprising a communications terminal configured for communication with the user authentication device and a verifier configured for communication with the communications terminal. It will be understood that the user authentication information issued by the user authentication device can be provided to the communications terminal and communicated by the communications terminal to the verifier for authentication.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

The present invention will be described herein with reference to exemplary authentication devices for issuing authentication information and an associated authentication system. It is to be appreciated, however, that the invention is not restricted to use with the particular illustrative device and system configurations shown.

It will be understood by those skilled in the art that an authentication device uses power supplied by a battery. However, the authentication device is a sealed device meaning the battery cannot be changed in the event of the battery running low. Some conventional approaches have addressed this issue by incorporating a larger capacity battery to extend the token life.

The authentication device as described herein comprises a photovoltaic panel such that when a user brings the device into the light the display can turn on enabling the user to read the authentication information. It will be appreciated that since the current authentication devices cannot be used in the dark or low light conditions there is no reason to have the display on in these conditions. Furthermore, the photovoltaic panel in the device as described herein can be used to charge a storage element in the device to power the display.

This charge would be sufficient to not only turn on the display but to provide all the power needed to run the display. Moreover, the device as described herein can use the excess power to power a processor and a memory unit. This can allow for a relatively small primary cell to be used as a back-up battery.

The device comprising the photovoltaic panel can extend the life of the device especially in event-based designs. There is an expense to the user to deploy an authentication device. A longer life for the authentication device means fewer deployments and a lower total cost of ownership for the user.

Figure 1:
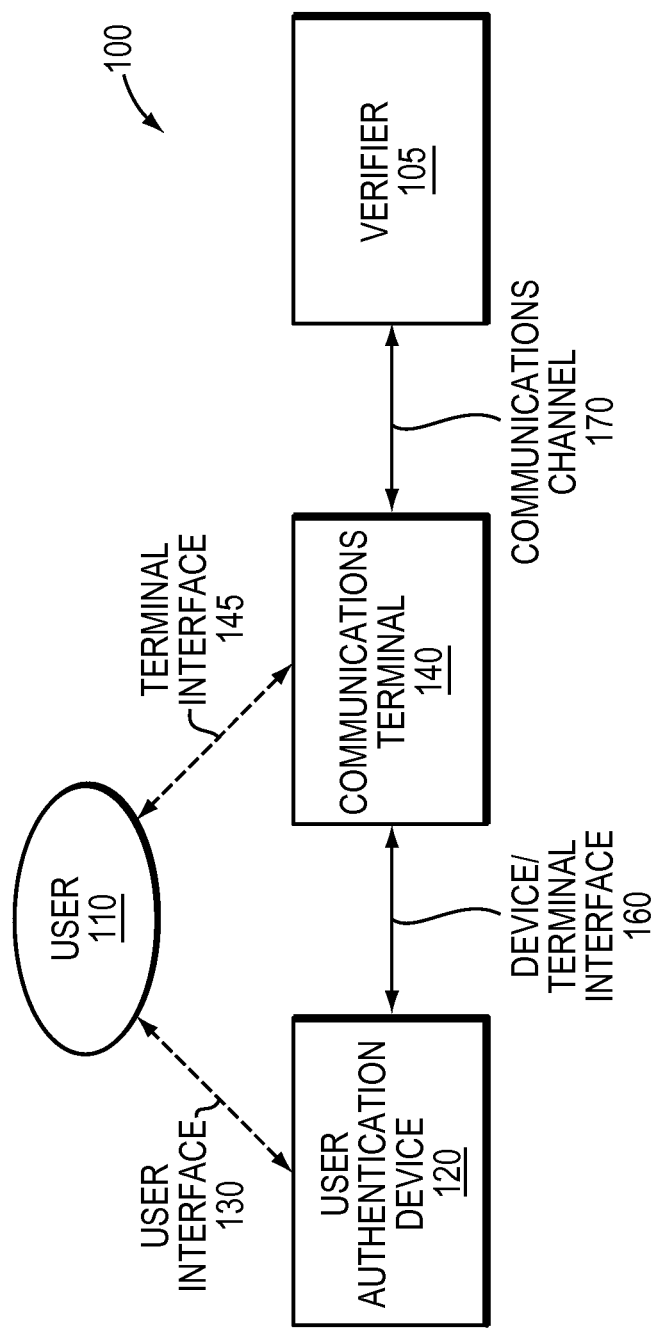
FIG. 1 is simplified block diagram showing one example of an authentication system.

Referring to FIG. 1, there is illustrated an example embodiment of an authentication system 100 comprising a verifier 105 for securely authenticating the identity of an exemplary user 110. As used herein, "authenticate" means to verify the identity of a user, and so "authenticate" and "verify" can be used interchangeably throughout. Also, although the specification will discuss, for simplicity, authentication of "users," it should be understood that "users" means any entity requiring authentication such as, for example, a person, animal, device, machine, or computer. The inclusion of a single user 110 is exemplary, and typically a verifier 105 will be used to verify a large number of users 110. Similarly, the inclusion of a single verifier 105 is exemplary, and typically a user 110 can have an authentication attempt verified by one or more of a large number of verifiers 105. In some embodiments, a single verifier 105 is able to verify a user 110, while in other embodiments, two or more verifiers 105 are together required to perform this task.

The verifier 105 can be any sort of device that implements the functions described herein. In one embodiment, the verifier 105 is implemented as software running on a server class computer including a processor, memory, and so on, to enable authentication of a large number of users, for example, in an enterprise. The verifier 105 can also be implemented as software running on a desktop computer, laptop computer, special-purpose device, a smart-phone or personal digital assistant (PDA). For example, the verifier 105 can be implemented as a software program running on a general-purpose computer, possibly interacting with one or more other computer programs on the same or a different computer. Some or all of the verifier 105 functionality can be implemented in hardware, for example in an Application Specific Integrated Circuit (ASIC) and the like. In still further embodiments, the verifier 105 can be implemented in a cellular telephone, or specialized hardware embedded in a cellular telephone and adapted to interact with the cellular telephone's circuitry. It will be appreciated by those skilled in the art that other sizes, shapes, and implementations are also possible.

Authentication can result in the performance of one or more actions including providing access or privileges, taking action, or enabling some combination of the two. For example, access can include access to a physical location, communications network, computer system, and so on. It will also be appreciated that access can refer to levels of information and the like.

As illustrated, a user 110 can communicate with a user authentication device 120. The user authentication device 120 provides authentication information used to authenticate the user 110. The user authentication device 120 can provide a user interface 130. Communication between the user 110 and the user authentication device 120 can take place via this user interface 130. The user interface 130 can provide an input interface and an output interface.

An input interface enables the user 110 to communicate information to the user authentication device 120. The input interface can be any mechanism for receiving user input. For example, the input interface can be a keypad or keyboard, one or more push buttons, switches or knobs, a touch sensitive screen, a pointing or pressing device, a trackball, a device for capturing sound or voice or handwriting, a device for capturing biometric input, and so forth.

An output interface enables the user authentication device 120 to communicate information to the user 110 and may be any mechanism for communicating to a user. For example, the output interface can be a visual display to support alphanumeric characters or graphics such as a LCD display or LED display, an electrophoretic display, one or more light sources, a loudspeaker, a sound or voice generator; a vibration interface, and so forth.

The user authentication device 120 can take various forms in various embodiments provided that the user authentication device 120 performs the functions required of the user authentication device 120 for secure authentication. The user authentication device 120 can be implemented in packages having a wide variety of shapes and form factors. For example, the user authentication device 120 can be a credit-card sized and shaped device, or can be much smaller or much larger. In other examples, the user authentication device 120 may be a "key fob" sized and shaped to fit on a key ring. Other sizes, shapes, and implementations are also possible.

Exemplary authentication devices in accordance with the embodiments herein are members of the RSA SECURID family of authentication tokens, available from RSA, The Security Division of EMC, of Bedford, Mass.

It will be appreciated that the term 'authentication information' used herein is intended to be construed broadly so as to encompass any type of authentication data that may be required in order to obtain access to an access-controlled resource. Thus, the term is intended to encompass, for example, alphabetic or numeric or alphanumeric passcodes, images, sets of words, sentences, phrases, questions/answers, or any other type of authentication data.

The exemplary user 110 can have both direct access to a communications terminal 140 and indirect access to the communications terminal 140 via the user authentication device 120. The communications terminal 140 can take various forms in various embodiments, including without limitation: a card reader; a device receptacle, cradle, or holder; a personal computer; a telephone; a personal digital assistant (PDA); a network interface card; a wireless transceiver; and so on. For example, during the authentication process the user 110 can directly communicate information to the device 120, the terminal 140 or both the device 120 and the terminal 140. Likewise, the communications terminal 140 can receive direct input from the user 110, the user authentication device 120 or both. As shown, the user 110 can communicate directly with the communications terminal via terminal user interface 145 that can be present depending on the implementation of the communications terminal 140. Like the device user interface 130, the terminal user interface 145 can include an input interface, an output interface, or both. The input and the output interfaces can take one or more of the forms described above for the device user interface 130, or other forms.

The communications terminal 140 can also provide a device/terminal interface 160 for communications between the terminal 140 and the user authentication device 120. In one embodiment, this interface can take the form of a wired or wireless communications channel between the terminal 140 and the device 120, using standard or proprietary protocols. For example, in an embodiment in which the device 120 is a token that has wireless communications capability and the terminal 140 includes a wireless transceiver, the interface 160 could be a wireless link.

The communications terminal 140 communicates authentication information to the verifier 105 via a communications channel 170. The communications channel 170 can be any method and/or interface that enables communication of information to the verifier 105 that is required to authenticate the identity of the user 110. The communications terminal 140 can communicate information generated by the user 110, the device 120, or both, to the verifier 105 over a communications channel 170. The communications terminal 140 and the verifier 105 can implement the communication channel 170 through a variety of connections including standard telephone lines, LAN or WAN links (e.g., 802.11, T1, T3, 56 kb, X.25), broadband connections (ISDN, Frame Relay, ATM), and wireless connections. Connections between the communications terminal 140 and verifier 105 can be established using a variety of communication protocols (e.g., TCP/IP, IPX, SPX, NetBIOS, Ethernet, RS232, and direct asynchronous connections). The verifier 105 processes the information received from the communications terminal 140. The verifier 105 can perform actions in response to authenticating the identity of the user 110. For example, the verifier 105 can grant on-line access to data or physical access to restricted areas or physical items.

Figure 2:
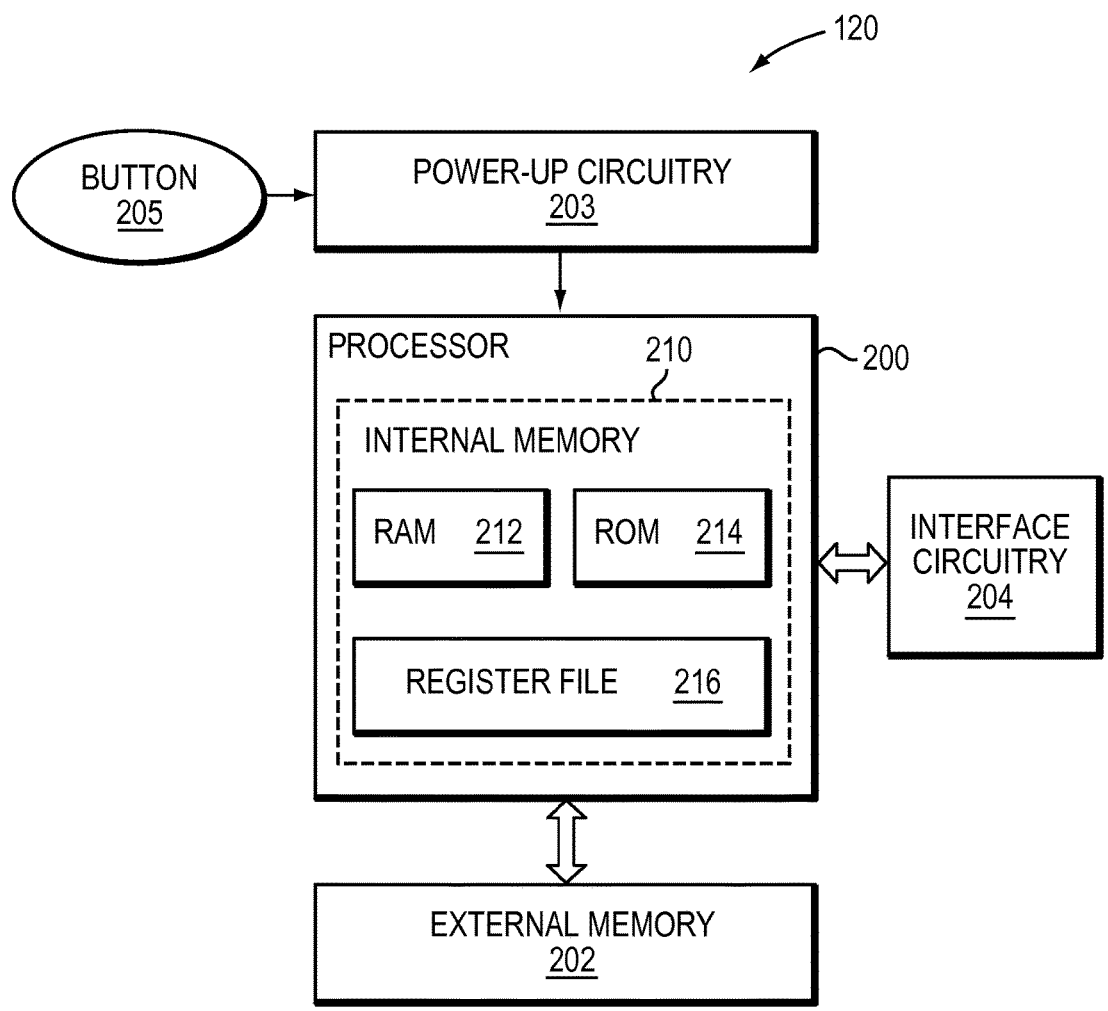
FIG. 2 shows a more detailed view of one possible implementation of an event-triggered user authentication device of the system of FIG. 1.

Referring to FIG. 2, there is shown a more detailed illustrative implementation of the user authentication device 120. The authentication device or token in this embodiment comprises a processor 200 coupled to an external memory 202. The memory 202 is referred to as "external" in that it is external to the processor 200. It should be noted that the external memory may be optional. In other embodiments, the external memory 202 may be eliminated, with the token utilizing only memory that is internal to the processor 200.

Processor 200 is also coupled to interface circuitry 204 which may comprise, for example, circuitry for interfacing the authentication token 120 to the communications terminal 140 via a wired or wireless connection or circuitry for generating a visual or audible presentation of a passcode. As discussed above, the interface circuitry may include, for example, wired or wireless interface circuitry such as USB, Bluetooth or 802.11 circuitry, or one or more speakers, displays and associated drivers, in any combination.

The authentication token 120 comprises a trigger button 205 which the user 110 depresses each time the user requires generation of a new password. This is an example of an event trigger for an event-triggered authentication token, and such an event trigger is itself an example of what is more generally referred to herein as a trigger source. The trigger button is shown as being coupled via power-up circuitry 208 to the processor 200, although other arrangements are possible. More detailed examples of the power-up circuitry 208 and its relation to the event trigger will be discussed below.

It will be understood that in this embodiment the power-up circuitry 208 comprises a photovoltaic panel configured such that the photovoltaic panel can assist in powering the authentication token 120 in response to the token being exposed to the light. The photovoltaic panel can be provided on an outer surface of the token 120. For example, the photovoltaic panel can be formed integrally with the outer surface of the token. This photovoltaic panel can comprise a plurality of photovoltaic cells for assisting in powering the authentication token 120.

It will be further understood that the power-up circuitry 208 can comprise a capacitor connected to the photovoltaic panel for facilitating charging the capacitor. Alternatively, the power-up circuitry can comprise a rechargeable battery connected to the photovoltaic panel for facilitating charging the rechargeable battery. In this embodiment, a super capacitor is connected to the photovoltaic panel through a diode for facilitating charging the capacitor. When the trigger source 205, as described above, is actuated the charge can be released from the capacitor to power the device. It will be understood from the above that the passcode may be displayed on a display in response to the source 205 being actuated.

It will also be appreciated that in this embodiment the memory, for example, the external memory 202 may store pre-determined passcodes for facilitation authentication of the user. For example, the passcodes can be generated on a processing system external to the device and stored in memory on the device. The processor 200 may be configured for determining the pre-determined passcodes to be issued from the token in response to the trigger button being actuated. It will be understood that the processor 200 may be configured for issuing the passcodes sequentially. In other words, the processor may work through the pre-determined passcodes sequentially in response to each actuation.

The processor 200 may be, for example, a microprocessor, a microcontroller, or another type of digital data processor. In this embodiment, the processor comprises internal memory 210, which more particularly comprises internal random access memory (RAM) 212, internal read-only memory (ROM) 214, and a register file 216. The register file may comprise, for example, control and status registers, special function registers, or other types of registers. Such a register file typically contains information about the current state of the processor and information used to control the operation of the processor. The processor will also generally include additional elements such as an instruction decoder, arithmetic logic units, and other elements typically found in a conventional processor, although such elements are not explicitly shown in the figure.

The various elements 200, 202 and 204 of FIG. 2 may be implemented in whole or in part as a conventional microprocessor, microcontroller, digital signal processor, application-specific integrated circuit (ASIC) or other type of circuitry, as well as portions or combinations of such circuitry elements. As will be appreciated by those skilled in the art, portions of a process in accordance with an embodiment of the invention can be implemented at least in part in the form of one or more programs that are stored at least in part in one or more of the memories 202, 210 and executed by processor 200.

Figure 3A:
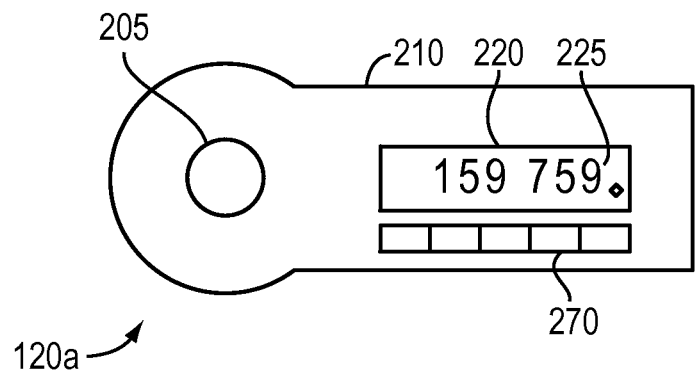
FIGS. 3(a) and (b) show examples of event-triggered user authentication devices of the system of FIG. 1.
Figure 3B:
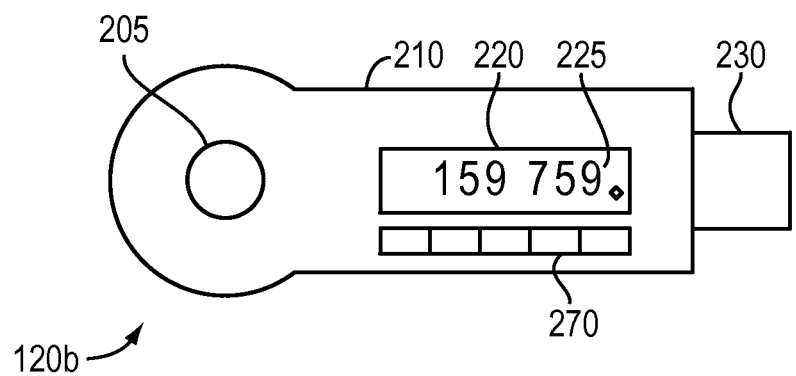

Referring to FIGS. 3(a) and (b), there is illustrated example embodiments of user authentication devices such as authentication tokens 120a and 120b for issuing authentication information. It will be understood that in exemplary embodiments the authentication tokens may be manufactured by RSA, The Security Division of EMC, of Bedford, Mass. The tokens 120 may issue authentication information for authenticating a user in an authentication system substantially similar to the system 100 as described with respect to FIG. 1. The tokens 120 can comprise a main body 210 having a user output interface in the form of a display 220 for presenting authentication information to the user. For example, the authentication information can be passcodes. It can be seen that in this embodiment the display 220 can issue six numerals 225 that represent the passcode. It will be understood that the passcode may be a unique code known only to the respective authentication tokens and the verifier for facilitating authentication of a user in the system such that the user can access an access-controlled resource. Additionally, the tokens comprise a trigger button 205 which the user 110 depresses each time the user requires generation of a new passcode. Furthermore, the tokens 120 comprise a photovoltaic panel 270 comprising a plurality of photovoltaic cells configured for assisting in powering the token in response to the token being placed in the light. Moreover, it will be appreciated that the token 120b also comprises, as illustrated with respect to FIG. 3(b), a plug member 230 such as a USB plug member for facilitating communication between the terminal 140 and the token 120b.

Figure 4:
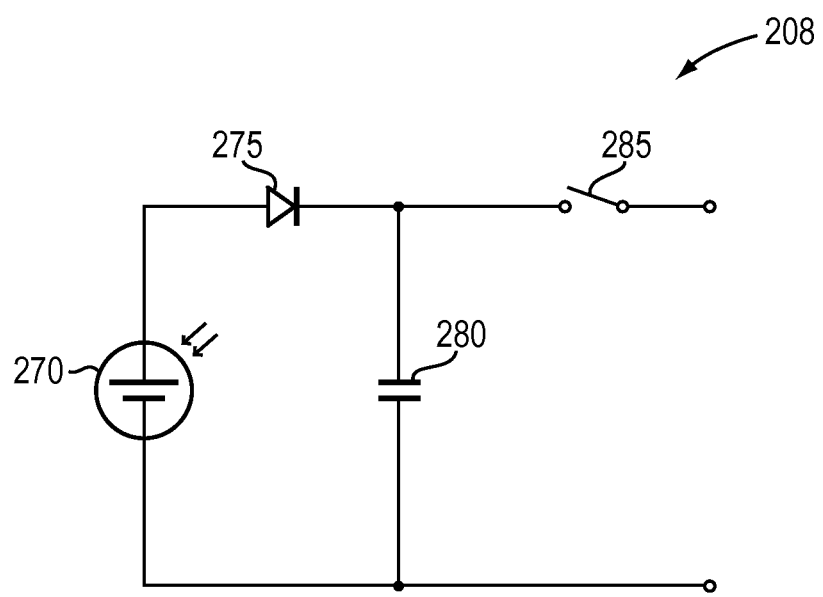
FIG. 4 shows an example of power-up circuitry of an event-triggered authentication device.

Referring to FIG. 4, there is illustrated an example of the power-up circuitry 208 of FIG. 2 comprising a photovoltaic panel 270, a diode 275 and a capacitor 280. The switch 285 in this example may be considered to represent the trigger source 205 or a portion thereof or part of the power-up circuitry. For example, the trigger source may comprise button and associated switch. The photovoltaic panel 270 comprises a plurality of cells arranged on a surface of the authentication token 120. The array of cells has a positive terminal connected to one end of a capacitor 280 through a diode 275 for reverse current prevention. The panel 270 has a negative terminal connected to the other end of the capacitor 280. It will be appreciated that when light irradiates the panel the circuit starts charging the capacitor 280. By closing the switch 285, or depressing the button 205, the charge is released from the capacitor such that the power is sufficient to issue the authentication information from the memory. For example, the authentication information may be a passcode displayed on a display of the authentication token.

While the description describes the trigger source comprising a trigger button having an associated switch that when actuated releases the charge from the capacitor, it will be understood that the trigger source may also be an electronics trigger such that when the light hits the photovoltaic panel the display and/or processor are activated. It will be appreciated that this may be the scenario when passcodes are indexed from the memory. If the token is a time based unit the photocells activate and power the display or other parts of the circuit that may not be related to time keeping.

It should again be emphasized that the above-described embodiments of the invention are presented for purposes of illustration. Many variations and other alternative embodiments may be used. For example, although described in the context of event-based and time-based authentication tokens, the techniques are applicable to a wide variety of other types of authentication devices or other hand-held devices. Also, the particular configuration of system and device elements shown in the figures may be varied in other embodiments. Numerous other alternative embodiments within the scope of the appended claims will be readily apparent to those skilled in the art.

What is claimed is:

1. A processorless user authentication device, comprising:
 a chargeable device;
 a photovoltaic panel for charging the chargeable device, wherein the photovoltaic panel is arranged such that the chargeable device is charged when the photovoltaic panel is exposed to light;
 an input mechanism for facilitating the release of charge from the chargeable device;
 a non-volatile memory including a pre-produced sequence of one-time passwords;
 a circuit board constructed and arranged for indexing into the non-volatile memory of the hardware device upon a request for a one-time password to read the one-time password; and
 an output device constructed and arranged to output a read one-time password, wherein the output device comprises a display for displaying one-time passwords;
 characterized in that indexing includes dividing a numeric value used for indexing by a number of one-time password elements in the non-volatile memory, using the result as the offset to read a first one-time password from the non-volatile memory, using the remainder of the division as an offset to read a second one-time password from the non-volatile memory, and exclusive-oring the first one-time password and the second one-time password to produce the one-time password.

2. The processorless user authentication device as claimed in claim 1, wherein the photovoltaic panel is provided on an outer surface of the processorless user authentication device.

3. The processorless user authentication device as claimed in claim 2, wherein the photovoltaic panel is formed integrally with the outer surface of the processorless user authentication device.

4. The processorless user authentication device as claimed in claim 1, wherein the photovoltaic panel comprises a plurality of photovoltaic cells.

5. The processorless user authentication device as claimed in claim 1, wherein the chargeable device comprises a capacitor that is connected to the photovoltaic panel.

6. The processorless user authentication device as claimed in claim 5, wherein the input mechanism comprises a button and an associated switch that when actuated releases the charge from the capacitor.

7. The processorless user authentication device as claimed in claim 1, wherein the pre-produced sequence of one-time passwords are generated on a processing system external to the processorless user authentication device and stored on the processorless user authentication device.

8. The processorless user authentication device as claimed in claim 1, wherein the processorless user authentication device is configured for authenticating a user in an authentication system for enabling access to an access-controlled resource.

9. A user authentication system, comprising:
 the processorless user authentication device as claimed in claim 1;
 a communications terminal configured for communicating with the processorless user authentication device; and
 a verifier configured for communicating with the communications terminal and authenticating a user.

* * * * *